United States Patent [19]

Merlin et al.

[11] 3,988,549

[45] Oct. 26, 1976

[54] KEYBOARD TYPE TELEPHONE STATION ADAPTED TO TRANSMIT DIALLING PULSES AND MULTIFREQUENCY SIGNALS

[76] Inventors: Jean C. Merlin, 2, rue Lamartine, 92130 Issy-les-Moulineaux; Bernard M. Serres, 51, avenue de la Paix, 94260 Fresnes, both of France

[22] Filed: Feb. 10, 1975

[21] Appl. No.: 548,580

[30] Foreign Application Priority Data
Feb. 14, 1974 France .................... 74.05051

[52] U.S. Cl. ............................ 179/90 K; 179/2 DP
[51] Int. Cl.² ................... H04M 1/30; H04M 1/50
[58] Field of Search .............. 179/90 K, 2 DP, 90 B, 179/90 R, 6.3 R

[56] References Cited
UNITED STATES PATENTS

| | | | |
|---|---|---|---|
| 3,301,957 | 1/1967 | Germond et al. ................ | 179/2 DP |
| 3,371,162 | 2/1968 | Scantlin ........................... | 179/2 DP |
| 3,541,262 | 11/1970 | Yachabach ....................... | 179/6.3 R |
| 3,652,795 | 3/1972 | Wolf et al. ........................ | 179/2 DP |
| 3,728,490 | 4/1973 | Nowicki ........................... | 179/6.3 R |
| 3,778,556 | 12/1973 | Mees et al. ....................... | 179/90 K |
| 3,920,926 | 11/1975 | Lenaerts et al. .................. | 179/90 B |
| 3,932,709 | 1/1976 | Hoff et al. ........................ | 179/90 K |

FOREIGN PATENTS OR APPLICATIONS 1,307,266   2/1973   United Kingdom

*Primary Examiner*—Kathleen H. Claffy
*Assistant Examiner*—Gerald L. Brigance
*Attorney, Agent, or Firm*—Abraham A. Saffitz

[57] ABSTRACT

Telephone set arrangement designed to be used as a computer terminal. It has a first call generator transmitting call pulse trains and a second call generator transmitting call multifrequency signals. During the call, the two kinds of call signals are transmitted simultaneously. After completion of the call, the supply current is reversed as usual. The current reversal is detected and the pulse train generator is then blocked. Any transmission of signals after completion of the call is then made only in the form of multifrequency signals.

2 Claims, 5 Drawing Figures

KEYBOARD TYPE TELEPHONE STATION ADAPTED TO TRANSMIT DIALLING PULSES AND MULTIFREQUENCY SIGNALS

BACKGROUND OF THE INVENTION

1. Field of the Invention

This invention relates to telephone subscribers' sets and, more particularly, to an automatic telephone subscriber's set which is able to generate calling signals in the form of decimal code pulse trains and multifrequency code a.c. signals according to CCITT Recommendation number Q 23.

2. Description of the Prior Art

Subscribers' sets connected to automatic telephone exchanges include a device by which a user can transmit to the exchange equipment the information necessary to set up a required connection. The device may include a dial or a series of twelve push-buttons forming a keyboard. Conventional automatic telephone exchange equipment is operated by decimal code pulse trains. Some recent telephone exchanges have multifrequency code receivers enabling the called number to be transmitted not as trains of pulses but as multifrequency combinations in a code "p out of n".

Push-button telephone sets are available for use with both decimal code calling signal operated exchanges and multifrequency code calling signal operated exchanges. These telephone sets comprise a pulse generator means for generating decimal pulse trains and a frequency generator means for generating multifrequency calling signals. Switching means are provided for selectively connecting either the pulse generator means or the frequency generator means to a subscriber's line.

The normal access procedure for automatic telephone subscriber is for the subscriber to call the computer unit and, once connected thereto, to transmit data and control signals. Accordingly, when the subscriber is connected to an exchange operated by decimal code calling signals, he has to send direct current pulse trains to the switching network for implementing connection to the computer unit and then to transmit multifrequency code alternating current signals.

To change over from pulse transmission during dialling to frequency transmission after trunking, there are two possibilities: — switching the keyboard to one or the other of the two transmitters both connected to the line as taught by British Patent No. 1,298,077 or switching to line the output of one or the other of the two transmitters both connected to the keyboard as taught by British Pat. No. 1,307,266 (which comes to the same thing), in dependence upon the position of a changeover button at the station. This changeover button can be one of the existing push-buttons of the keyboard. However, such push-button must not be one which triggers the pulse transmitter so as to avoid interrupting the call. Such push-buttons are available in the form of keys Nos. 11 and 12, marked * and # , of the telephone keyboard, which are not used for pulse transmission. Thus no special button is required. All that the subscriber who wishes to use his station as a computer terminal has to do is to follow dialling and trunking by actuation of the * or # key before transmitting data to the computer. The disadvantage of this kind of operation is that it is different from what a subscriber having just a push-button set connected to an exchange having multifrequency code receivers has to do, since the latter kind of subscriber does not have to operate an extra key after trunking and before data transmission.

SUMMARY OF THE INVENTION

This invention obviates these above disadvantages by providing a subscriber's set having both a pulse generator means and a frequency generator means, further comprising means for selectively operating the pulse generator means and the frequency generator means both together and the frequency generator means alone in response to a device detecting the reversal of the current of the subscriber's set carried out by all exchanges upon the completion of trunking.

Since there is no inconvenience in transmitting frequencies as well as loop interruption pulses during dialling, it is not actually necessary to make a real changeover from one kind of generator to the other, and so the audio-frequency generator can operate continuously and the pulse generator operation can be selectively superimposed upon the operation of the audio-frequency generator. All that is necessary for the purposes of the invention is that once trunking is complete, the current reversal detector cuts off the pulse generator.

This leads to another useful feature of the proposed subscriber's set. It can very readily be converted into a multifrequency code push-button set by wiring a permanent connection to the pulse generator. This is a useful feature if the associated exchange is subsequently to have multifrequency receivers, since the exchange conversion does not entail changing the subscribers' sets and requires only a very simple modification.

OBJECTS OF THE INVENTION

The object of the present invention is to provide automatic telephone subscribers with access, via the telephone exchange network, to computer facilities, the subscriber using the calling device of his telephone set to transmit data and control signals to the computer.

Further and other objects of the invention will become apparent from the following description and accompanying drawings which appear hereafter.

The invention will be more clearly understood by reference to the following description and to the accompanying drawings wherein:

DESCRIPTION OF THE PREFERRED EMBODIMENTS

Like references denote like elements throughout the drawings.

Figure 1:
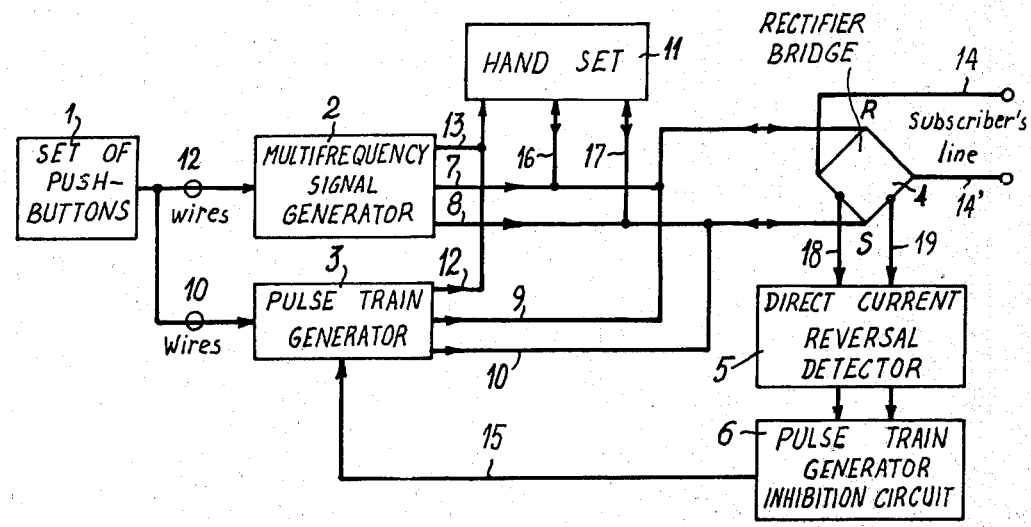
FIG. 1 is a diagrammatic view of the novel parts according to the invention, of a subscriber's set having a pulse generator and a multifrequency generator, said novel parts allowing the subscriber's set to operate as a data transmitter.

Referring first to FIG. 1, the subscriber's set comprises a hand-set 11 and the conventional associated circuits and a keyboard 1 with 12 keys and one contact per key, the 12 keys controlling a multifrequency signal generator 2 while 10 of the keys control a pulse train generator 3. These ten keys correspond to the decimal digits 1 to 0; the two remaining keys which are marked * and # only control the multifrequency signal generator.

The subscriber's set is fed through rectifier bridge 4 which serves to supply the microphone and to power the electronic circuits independently of the polarity of line energization. Rectifier bridge 4 is connected on one side to the subscriber's line 14–14' and on the other side to hand-set 11 through leads 16 and 17, to multifrequency signal generator 2 by leads 7 and 8 and to pulse train generator 3 by leads 9 and 10.

The subscriber's set further comprises two novel circuits: a direct current reversal detector 5 connected to the rectifier bridge 4 through leads 18 and 19 and a pulse train generator inhibition circuit 6 which when inoperative allows the pulse train generator 3 to open the subscriber's loop in response to the dialled number and which when operative blocks the pulse train generator through lead 15. Inhibition circuit 6 changes over from inoperative to operative state when a direct current reversal is detected by detector 5.

Also visible in FIG. 1 are connections between the keyboard 1 and the transmitter 3 (10 wires) and between the keyboard 1 and the transmitter 2 (12 wires) and connections between respectively the generators 2 and 3 and the hand-set 11. By way of these connections 12, 13, it is possible to disconnect the earphone or the loudspeaker during dialling and multifrequency calling.

Figure 2:
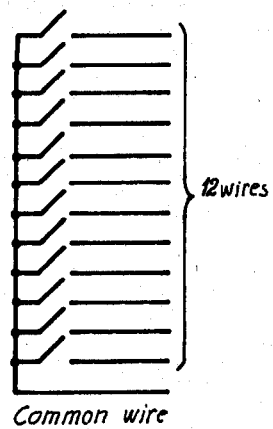
FIG. 2 represents the keyboard of the telephone set known in the prior art.
Figure 3:
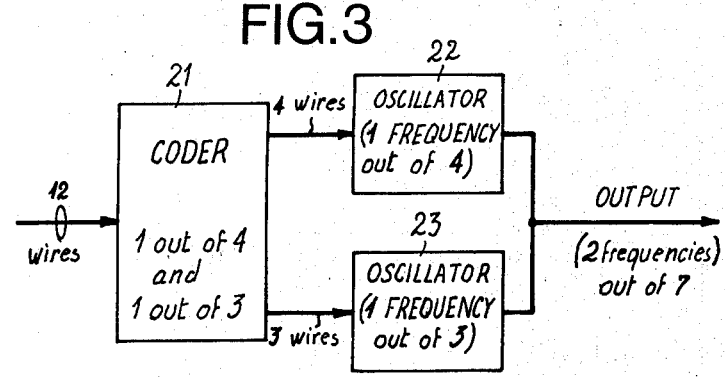
FIG. 3 represents in the form of a block diagram the multifrequency generator known in the prior art.
Figure 4:
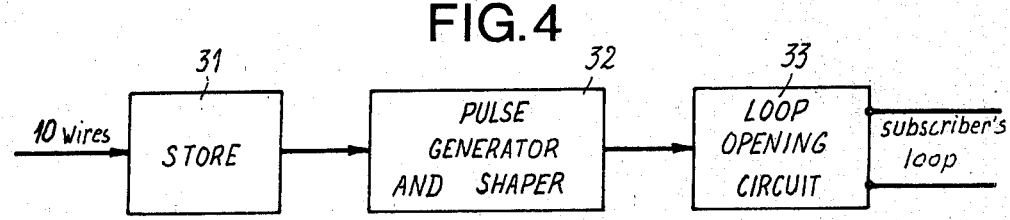
FIG. 4 represents in the form of a block diagram the pulse train generator known in the prior art.

FIGS. 2, 3 and 4 show respectively the 12-key keyboard, the multifrequency signal generator and the pulse train generator, all of which are familiar in the art.

The multifrequency signal generator 2 of FIG. 3 comprises a coder 21 which converts a signal selectively appearing on one out of 12 wires into two signals correlatively appearing, the first on one out of 4 wires, the second on one out of 3 wires, an oscillator 22 with four switchable resonant circuits and an oscillator 23 with three switchable resonant circuits. The output signal is formed of two frequencies out of seven.

The pulse train generator 3 of FIG. 4 comprises a store 31 for adapting the speed of keyboard manipulation to the duration of the pulse trains transmitted for each digit. The store capacity must be of 16 digits, the maximum number of digits comprised in a call number. Store 31 is connected to pulse generator and shaper 32 and loop opening circuit 33.

Figure 5:
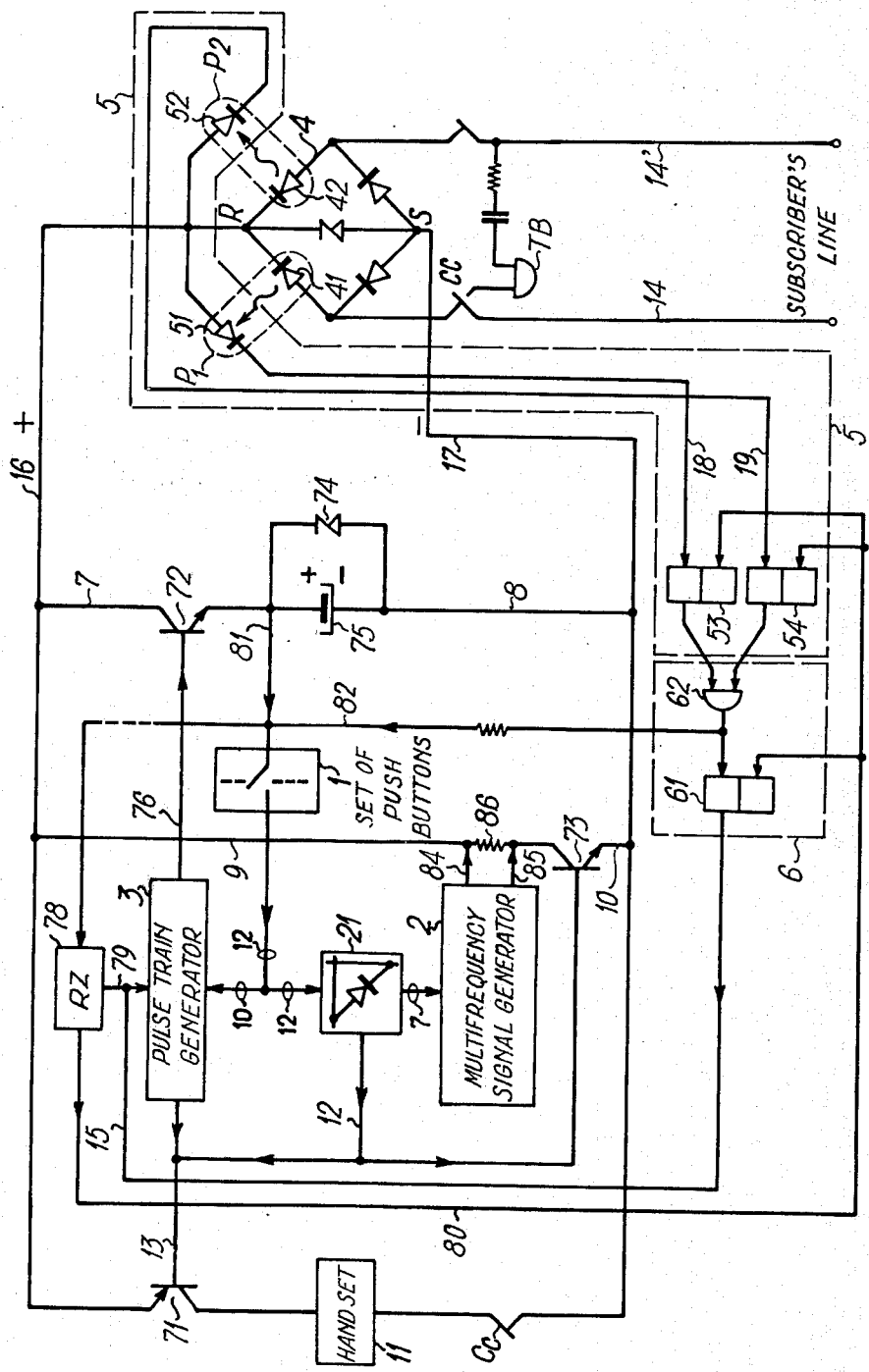
FIG. 5 is a more detailed view of the subscriber's set and data transmitter of FIG. 1.

FIG. 5 is a more detailed view of the complete telephone set and data transmitter of FIG. 1.

The rectifier bridge 4 comprises four diodes two of which 41 and 42 are electroluminescent diodes located in two adjacent arms of bridge 4. These electroluminescent diodes co-operate respectively with two phototransistors 51 and 52, the pairs 41–51 and 42–52 forming two opto-electronic couplers $P_1$ and $P_2$. The electroluminescent diode 41 is illuminated when wire 14 is at a positive potential with respect to wire 14' and electroluminescent diode 42 is illuminated when wire 14 is at a negative potential with respect to wire 14'.

The two phototransistors 51 and 52 are respectively connected to flipflops 53 and 54. These two flipflops are connected to flip-flop 61 via AND-gate 62. It results from the arrangement just described that flipflop 53 is operated when the telephone set is supplied with direct current and flipflop 54 and flipflop 61 are operated since the instant when the direct current is reversed due to the taking down of the called subscriber (computer unit).

In FIG. 5, there can be seen again the keyboard or set of push-buttons 1, the pulse train generator 3, the multifrequency signal generator 2 and the subscriber's hand-set 11. Generator 3 also comprises a buffer store and a control circuit for the transistors 71 and 72. Also provided are a transcoder circuit 21, a Zener diode 74, a capacitor 75 and three transistors 71, 72, 73. Those connections in FIG. 5 which have the same reference numbers as connections in FIG. 1 have the same functions as the latter connections. Also visible in FIG. 5 are a number of elements with literal references which do not form part of this invention. Among these elements TB is the telephone bell and Cc designate the contacts of the switching hook of the telephone set. A constant-polarity supply, e.g. positive on connection 16 and negative on connection 17, appear at apices S and R of the rectifier bridge 4.

OPERATION OF THE SYSTEM

The system operates as follows:

When the hand-set 11 is off-hooked, the line is looped via passing transistor 72 and Zener diode 74, the generator 3 transmitting an appropriate control signal to 72 via conductor 76. Capacitor 75 charges up for a few tens of milliseconds, during which time the hand-set 11 is isolated because transistor 71 is cut off by a signal which generator 3 transmits to conductor 13 and which is applied to the base of 71. At the end of this time a brief zero-resetting signal is transmitted to generator 3 via circuit 78 and conductor 79 and to the inhibitor circuit 6 via circuit 25 and conductor 80. The looping circuit of the subscriber's line embodied by transistor 72 and Zener diode 74 is cut off and the transistor 71 is made conductive by the generator 3. The loop including transistor 71 is substituted for the loop including transistor 72 and hand-set 11 is therefore in circuit on the line. One of the two photocouplers $P_1$ or $P_2$, e.g. $P_1$, is operative and flipflop 53, actuated by way of connection 18, changes over to state one. The common line of keyboard 1 is brought to a positive potential, e.g. by capacitor 75 and conductor 81, so that dialling can be initiated. Dialling is carried out at any desired rate, generator 3 storing the decimal dialled digits and transmitting them as a making and breaking of the circuit 72–74 by the control connection 76 to the base of 72. As long as there are digits remaining in the store, the transistor 71 is blocked by way of conductor 13 and hand-set 11 is cut off from the line; this must be so during dialling both through the agency of the pulse train generator 3 and through the agency of the multifrequency signal generator 2, to obviate unpleasant noises in the earpiece or in a loudspeaker.

Upon the completion of decimal dialling, generator 3 ceases to transmit signals for blocking transistor 71 and the same becomes conductive and brings into operation the circuit of hand-set 11, whereas 72 is cut off. When the called subscriber replies, line supply reversal leads to a reversal of operation of the photocouplers $P_1$ and $P_2$. It has been assumed that during dialling the diode 41 and the phototransistor 51 were conductive. Now, however, the diode 41 is non-conductive and the diode 42 and phototransistor 52 are conductive. The flipflop 54 controlled by 52 through connection 19 changes over to state one. Since both the flipflops 53 and 54 are in state one, AND-gate 62 is operative and flipflop 61 changes over to state one, so that pulse generator 3 is cut off via conductor 15. Keyboard 1 is then energized by circuit 6 and conductor 82 but only the multifrequency signal generator 2 is operative. While the keys of the keyboard are in operation, multifrequency transmission is by way of the transistor 73, for at this time there is a circuit for controlling the base of transistor 73 by keyboard 1, transcoder circuit 21 and conductor 12. Such circuit makes the transistor 73 conductive. The two alternating current signals are output by generator 2 to conductors 84, 85 and are also transmitted to resistor 86 and transistor 73 and to line 14–14' by way of rectifier bridge 4. During transmission of these frequencies the circuit of hand-set 11 is cut off, due to transistor 71 being cut off by the circuit 1, 21 and the conductors 12 and 13.

As explained in the introductory part of the specification, it is possible to readily convert the telephone set arrangement of FIG. 5 into a telephone set having only a multifrequency call device by permanently inactivating the pulse train generator 3. For this, lead 15 instead of being connected to blocking flipflop 61 is permanently biased to a blocking potential.

What we claim is:

1. In combination a telephone set arrangement connected to a telephone exchange by a subscriber's line and supplied therefrom by a direct current, the supply direct current direction being reversed in said telephone exchange upon completion of a call, said telephone set arrangement comprising:
   a telephone set;
   a keyboard with a plurality of keys;
   a call pulse train generator;
   means for controlling said call pulse train generator by said keyboard;
   a call multifrequency signal generator;
   means for controlling said call multifrequency signal generator by said keyboard;
   a rectifier bridge connected on one side to the subscriber's line and on the other side to the telephone set;
   two opto-electrical couplers respectively coupled to two adjacent arms of said rectifier bridge, whereby one of said opto-electric couplers is operative when the supply current has a given direction and the other opto-electric coupler is operative when the supply direct current direction is reversed in relation to said given direction;
   two flipflops respectively connected to said opto-electric couplers;
   an AND-gate having inputs connected to said flipflops;
   a direct current reversal detecting flipflop connected to the output of said AND-gate; and,
   means controlled by said direct current reversal detecting flipflop for inhibiting the control means of the call pulse train generator by the keyboard when the supply direct current is reversed in the telephone exchange upon completion of the call.

2. In combination a telephone set arrangement connected to a telephone exchange by a subscriber's line and supplied therefrom by a direct current, the supply direct current direction being reversed in said telephone exchange upon completion of a call, said telephone set arrangement comprising:
   a telephone set;
   a keyboard with a plurality of keys;
   a call pulse train generator;
   call pulse control means for controlling said call pulse train generator by connection to said keyboard;
   a call multifrequency signal generator;
   means for controlling said multifrequency signal generator by said keyboard;
   a first loop circuit including a first switching transistor controlled by said call pulse train generator for sending call pulse trains on to the subscriber's line;
   a second loop circuit including a second switching transistor controlled by said call multifrequency signal generator for sending call multifrequency signals on to the subscriber's line;
   a third loop circuit including the telephone set and a third switching transistor controlled by both said call pulse train generator and call multifrequency signal generator;
   a direct current reversal detector means connected to said call pulse train generator responsive to the direction of the supply direct current of the telephone set when a call is made and a number dialled on said first loop circuit; and,
   inhibition circuit means controlled by said direct current reversal detector means upon detection of current reversal for inhibiting said call pulse control means for the call pulse train generator by said keyboard.

* * * * *